United States Patent [19]
Afzal

[11] Patent Number: 5,717,578
[45] Date of Patent: Feb. 10, 1998

[54] CONSTANT CURRENT SOURCE EMPLOYING POWER CONVERSION CIRCUITRY

[75] Inventor: Ejaz Afzal, Laguna Niguel, Calif.

[73] Assignee: Emerging Technologies Corporation, Laguna Hills, Calif.

[21] Appl. No.: 597,859

[22] Filed: Feb. 7, 1996

[51] Int. Cl.$^6$ .............................. H02M 3/335; H02M 3/24
[52] U.S. Cl. ................................ 363/21; 363/97
[58] Field of Search ................... 363/20, 21, 80, 363/97, 96, 139; 323/285, 280, 281

[56] References Cited

U.S. PATENT DOCUMENTS

| | | | |
|---|---|---|---|
| 4,672,518 | 6/1987 | Murdock | 363/21 |
| 4,837,495 | 6/1989 | Zansky | 323/222 |
| 5,390,101 | 2/1995 | Brown | 363/20 |

OTHER PUBLICATIONS

Integrated Circuits, Unitrode Application Note: "A 25 Watt Off-Line Flyback Switching Regulator".

Benchmarq –bq2004, Fast Charge IC booklet (Published by Benchmarq Microelectronics, Inc.)—Apr. 1994.

"High Power Flyback Switching Regulators", by Neil Kepple, Keltec Company, Ft. Walton, Fl. (Originally presented at Wescon 77, Sep. 20, 1977, San Francisco, California).

"A Simple, Secondary–Referenced Constant Power Regulator Design Aid DA–9", Power Integrations, Inc., Aug. 1994.

*Primary Examiner*—Peter S. Wong
*Assistant Examiner*—Gregory J. Toatley, Jr.
*Attorney, Agent, or Firm*—Knobbe, Martens, Olson & Bear, LLP

[57] ABSTRACT

An energy source for supplying power to a rechargeable battery or the like provides a constant current input to the front end of a transformer. In order to compensate for varying inductances found in the primary winding of the transformer, a special resistor network is provided to precisely control the duty cycle of the current output.

15 Claims, 7 Drawing Sheets

CONSTANT CURRENT SOURCE EMPLOYING POWER CONVERSION CIRCUITRY

BACKGROUND OF THE INVENTION

1. Field of the Invention

The present invention relates to constant current power sources and, in a preferred embodiment, to constant current sources used for charging a rechargeable battery for a cellular telephone.

2. Description of the Related Art

Energy supplies for recharging rechargeable batteries are well known in the art. Such energy sources include constant power sources, and constant current sources. Typically, when it is desired to recharge a rechargeable battery, the battery is connected to an energy source which plugs into an alternating current (AC) wall outlet. The energy supply converts the AC energy into a direct current (DC) source of energy. The energy provided to the battery causes the battery to recharge to its maximum level, at which point the battery charger is disengaged or turned off.

Although many advantages were observed in constant current sources, such advantages are offset by the disadvantages previously encountered when attempting to implement a constant current source charger. Most notably, such constant current source chargers have suffered from low efficiency. This is due, in part, from the fact that current regulation was thought to be possible only at the secondary side of the transformer used to step the input voltage to the required level. Furthermore, due to certain constraints associated with constant current sources, the circuitry required to implement such sources is typically bulky and expensive. For example, in one previous constant current system, an AC waveform is applied to a wall mount step-down transformer which outputs a rectified DC power signal to a constant current regulator. In this system, the overall system efficiency is very low, since the step-down transformer typically has an efficiency of approximately 50%, while the constant current regulator typically has an efficiency of nearly 60%. In addition, the output power depends on the size of the transformer so that the charge rate of the battery is restricted if it is desired to have a smaller transformer. Thus, such systems are typically restricted to overnight charging applications and are not able to charge a battery completely within a short time. Consequently, most battery charging devices have been implemented as constant power sources rather than constant current sources.

For example, one previous system involves using an off-line constant power source wherein an AC waveform is converted to a rectified DC waveform which is controlled to keep the output power constant. Such systems sometimes include microcontroller units which sense the voltage and temperature of the battery in order to determine when the charged should be turned off so as not to overheat or overcharge the battery. For example, many batteries exhibit a distinct drop in voltage after reaching their full charges. This variation can be detected to indicate that the charging process should be stopped. However, it has been found that such systems include a number of disadvantages. For example, because the current varies in such a system, the voltage variation (i.e., reduction) is not as pronounced and may not be detectable. This is because variations in the current act to compensate for effects at the output which otherwise would have been compensated for via a voltage variation. Thus, because the slope of the voltage waveform plotted versus time has a smaller magnitude, it is sometimes difficult to determine if the voltage has began to drop within the time period necessary to prevent damage to the battery. Furthermore, in a fully discharged battery, the start current will be maximum because voltage is at a minimum. As the battery charges, however, the voltage increases, and the charging current reduces. This results in certain undesirable charge characteristics. For example, 40% of the charge will be supplied to an empty battery in the first 10% of the charging time, and the remaining 60% of the charge will require 90% of the charge time. Thus, the charge distribution is not optimized so that it takes longer to change the battery to the fully recharged state than is actually required. Furthermore, when the battery is fully recharged (i.e., charged to its maximum voltage), the current reduces to a fixed value to keep the voltage times the current (i.e., the power) equal to a constant. If the voltage of the battery being charged is not high, this results in a moderate current level being supplied to the battery even after the battery is fully charged. This causes internal heating and reduces the life of the battery. Finally, generic problems with this configuration of battery chargers include parasitic resistance in the current regulator circuit elements (e.g., in the regulating diode) provided at the output of the secondary winding.

In yet another conventional constant power fly-back converter, an electrical switch (e.g., implemented as a switching transistor) feeds current pulses to the battery under the control of a feedback circuit. In order to increase the current supplied to the battery, the switch duty cycle is controlled by a current feedback control circuit. When the current passing from the drain to the source of the switching transistor reaches a predetermined level, the switch is turned off, thereby reducing the current provided to the battery to essentially zero until the switch is once again opened. When the ON time of the switch is maximum, then the maximum current will flow to the battery, and while the ON time is minimum, the minimum amount of current will flow to the battery. An output voltage feedback loop, as well as a voltage proportional to the current through the switching transistor, are provided as inputs to the current control circuit to determine the duty cycle in the circuit. However, this system also includes the several disadvantages noted above which are associated with a constant power source.

Thus, present battery chargers are often cumbersome and bulky, or require an excess amount of time to charge a battery. Furthermore, such battery chargers sometimes overcharge or overheat batteries, causing a reduction in the life span of the battery. In addition, certain kinds of batteries, such as nickel cadmium batteries, exhibit a hysteresis-like memory effect, wherein the battery will actually charge to a different voltage than it is designed for after several recharges.

SUMMARY OF THE INVENTION

An improved battery charging circuit provides a substantially constant current output to a rechargeable battery. In a preferred embodiment, constant current is provided on the front end of the battery charging circuit so that a current regulator need not be provided at the output of the transformer circuit used to convert the input voltage level into an appropriate output voltage level. Thus, a number of the disadvantages associated with constant power sources and previous constant current sources are overcome by the current supply of the present invention.

Under one aspect, the preferred embodiment comprises a constant current supply circuit for converting a voltage input into a substantially constant supply current. The circuit comprises a voltage input terminal which receives the voltage input; an output terminal which provides the supply current output; a current generation circuit which receives the voltage input via the voltage input terminal and outputs the supply current to the output terminal; and a feedback control circuit in communication with the current generation circuit so as to provide a feedback input signal to the current generation circuit in order to maintain a substantially constant value of the supply current output. The feedback control circuit further comprises a current sensing circuit which provides a current sense signal indicative of the current output by the current generation circuit; a voltage level alteration circuit which produces an altered voltage signal which increases as the value of the current sense signal increases; and a comparator circuit which compares a voltage level on a first input with the altered voltage signal on a second input to provide the feedback input signal to the current generation circuit.

In a particularly preferred embodiment, the constant current supply circuit is implemented as a battery charger. In a still further preferred embodiment, the constant current supply circuit is implemented as a NiCd battery charger or as a battery charger for a rechargeable cellular telephone battery.

In another preferred embodiment, the comparator circuit comprises a pulse width modulation comparator followed by a clocked RS flip-flop.

In a further preferred embodiment, the voltage level alteration circuit comprises a voltage divider circuit.

In yet another preferred embodiment, the first input of the comparator connects to an output of a voltage error detector comprising a differential amplifier.

In a still further preferred embodiment, the current generation circuit comprises a switching transistor circuit, a transformer and a rectifier, while the current sense circuit comprises a resistor in series with a current source proportional to the current output.

Under another aspect, the preferred embodiment of the invention is a constant current supply circuit for converting a voltage input into a substantially constant supply current. The constant current supply circuit comprises a transformer having primary and secondary windings. The primary windings connect with an input side of the constant current supply circuit and the secondary windings connect with an output side of the constant current supply circuit. The constant current supply circuit further comprises an input terminal which connects to the input side of the constant current supply circuit; a constant current source on the input side of the constant current supply circuit which receives an input from the input terminal, and which connects to the primary windings to provide a substantially constant current input to the primary windings. The constant current source further comprises a current sensing feedback circuit which outputs a voltage proportional to the substantially constant supply current; a voltage level alteration circuit which receives the voltage generated by the current sensing feedback circuit to produce an altered voltage output; and a current control circuit having an input which receives the altered voltage output and applies the altered voltage to the input of the current control circuit. Finally, the constant current supply circuit comprises an output terminal which connects to the secondary windings and outputs a substantially constant output current.

Under a still further aspect, the preferred embodiment of the invention comprises a battery charging circuit comprising a housing which encloses electrical circuitry for converting an alternating current (AC) power input into an energy output for charging a battery; a pair of contacts on an external surface of the housing for outputting the energy to the battery; and a readily replaceable terminal assembly which is detachably engaged with the electrical circuitry within the housing. The terminal assembly has terminal elements which extend outwardly through apertures in the housing. The terminal elements are configured to engage with an outlet to establish an electrically conductive contact between the outlet and the electrical circuitry within the housing so as to provide the AC power input to the battery charging circuit when the terminal assembly is in an active position. The terminal assembly is pivotable within the housing so that the terminal elements can be flipped into an inactive position substantially flush with the external surface of the housing.

In a particularly preferred embodiment, the terminal elements are configured to engage with a standard United States wall outlet or, alternatively, with a standard International wall outlet.

DETAILED DESCRIPTION OF THE PREFERRED EMBODIMENT

Figure 1:
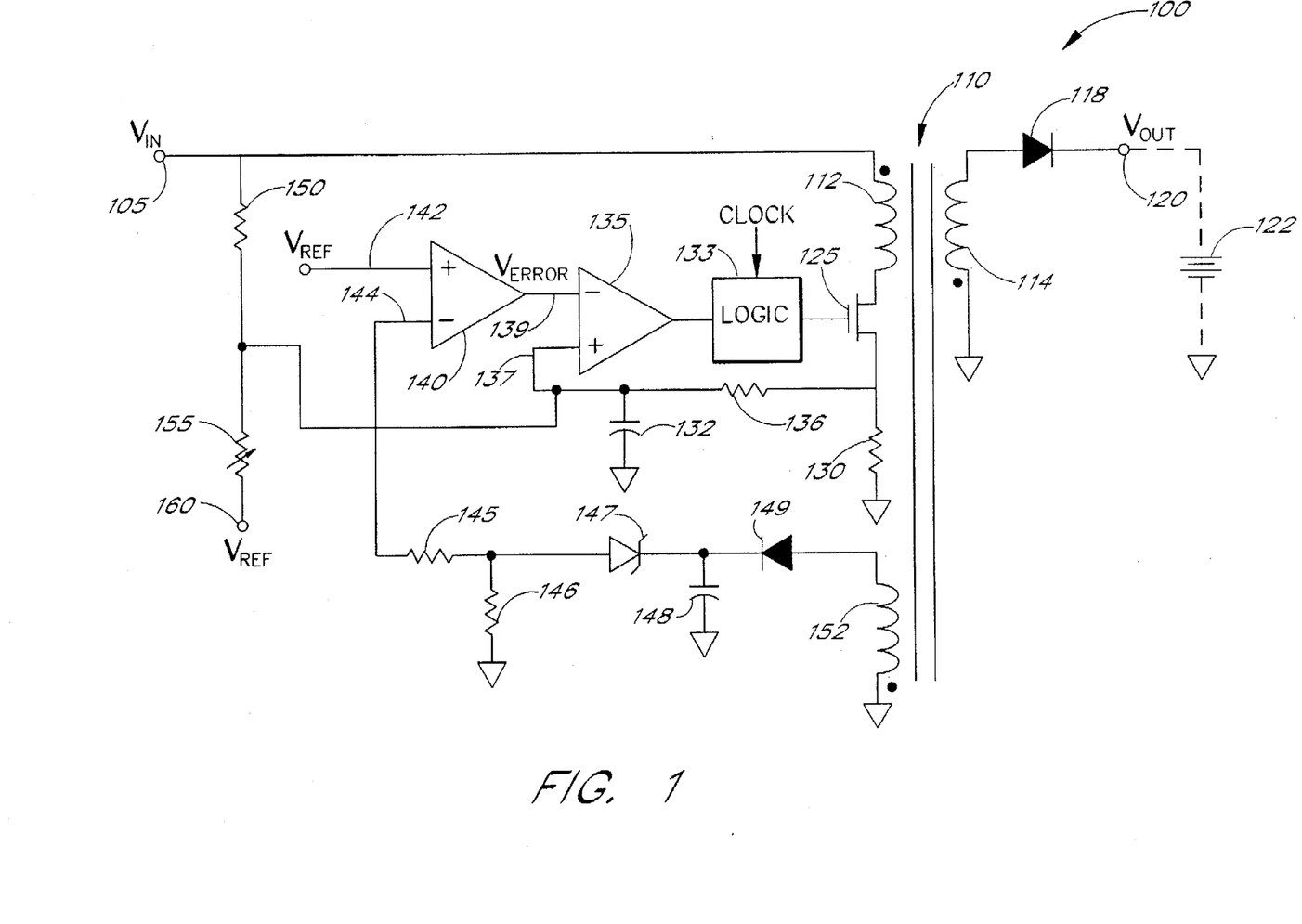
FIG. 1 is a schematic circuit diagram of the internal circuitry of the constant current source battery charger of the present invention.
Figure 2:
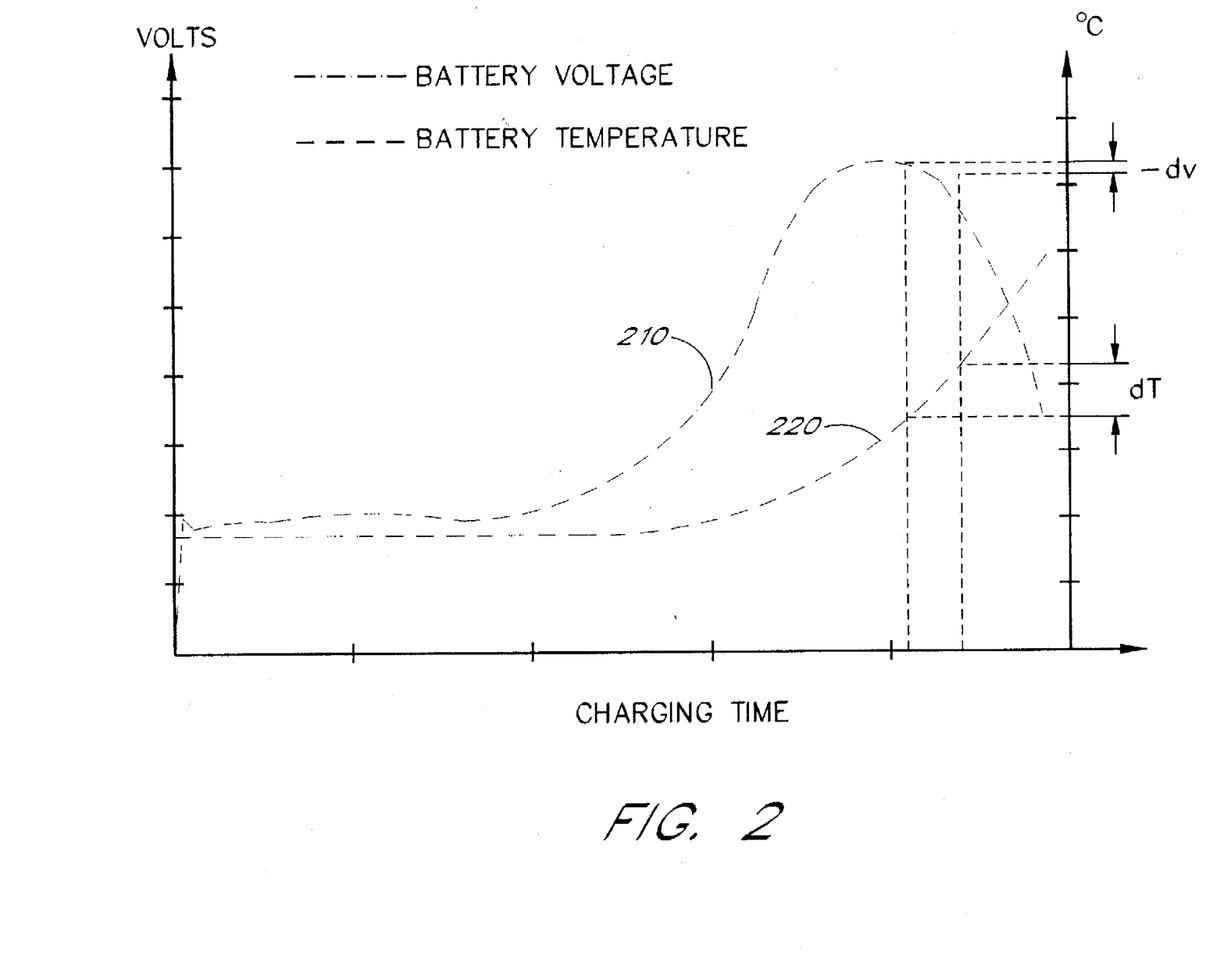
FIG. 2 graphically plots the battery voltage and battery temperature characteristics for nickel cadmium and nickel metal-hydride batteries, respectively.

In accordance with the teachings of the present invention, the improved battery charger of FIG. 1 provides an inexpensive battery charger which, at once, significantly reduces the amount of time required for charging a battery (e.g., a battery for a cellular telephone), and also ensures that the charging of the battery does not overheat or otherwise damage the battery. Plots 210 and 220 of the voltage characteristics for nickel cadmium (NiCd) and temperature characteristics for nickel metal-hydride (Ni—MH), respectively, are illustrated in FIG. 2. The first curve 210 represents the voltage characteristics plotted with respect to charging time of a nickel cadmium battery. As depicted in FIG. 2, the curve 210 levels off at a maximum point (i.e., the natural voltage of the fully charged battery) and actually begins to decline if charged for an excessive period of time. Thus, in these cases, it is advantageous to monitor this change in voltage with respect to time, and when this change approaches a slightly negative value, a signal is transmitted to the battery charger to discontinue charging. Alternatively, when a nickel metal-hydride battery is being charged, the temperature of the battery is the characteristic which is monitored for purposes of protecting the battery. The curve 220 in FIG. 2 represents the battery temperature of a nickel metal-hydride battery plotted with respect to charging time. As illustrated in FIG. 2, the temperature of the Ni—Mh battery increases very slowly over the initial charging time, but begins to increase more quickly as the battery becomes fully charged. Thus, it is advantageous to monitor the change in temperature with respect to time, and when this slope becomes sufficiently large, to send a signal to the battery charger to discontinue charging, or to supply only a trickle current (e.g., 3–4 milliamps) as a charge.

As will be discussed in greater detail below, the circuit of the present invention facilitates the accurate measurement of the voltage and temperature characteristics of the battery being charged. This is advantageously accomplished by providing a substantially constant current source which causes the voltage profile to vary more significantly so that a change in the voltage can be more easily detected. In like manner, the temperature profile is more dynamic since a substantial current is used to charge the battery throughout the charging process. Thus, it is easier to determine a change in the temperature of the battery.

FIG. 1 is a schematic circuit diagram of the main internal components of a constant current battery charger constructed in accordance with the preferred embodiment of the invention. The constant current source 100 includes a voltage input terminal 105 which provides a DC input voltage $V_{in}$ to a primary winding 112 of a transformer 110. The DC input voltage $V_{in}$ is advantageously provided by a rectifier (not shown) from the AC input lines (not shown). A first secondary winding 114 of the transformer 110 connects to ground on one side and to a rectifying diode 118 on the other. The rectifying diode 118 connects to an output terminal 120 which, in turn, connects to a battery 122 to be charged. In one advantageous embodiment, the transformer 110 comprises a ferrite core transformer including a primary-to-first secondary winding ratio of 10:1 (e.g., 120 turns in the primary winding 112 and 12 turns in the first secondary winding 114). Furthermore, the battery 122 may be a nickel cadmium, nickel metal-hydride, or like battery, such as used in cellular telephones, video cameras, or the like.

A second end of the primary winding 112, opposite the input terminal 105, connects to a drain input of a metal oxide semiconductor field effect transistor (MOSFET) 125. The source of the MOSFET 125 connects to a current sensing resistor 130 which, in turn, connects to ground. In one advantageous embodiment, the resistor 130 has a value of 1.5 ohms, and a tolerance of 2%, while the MOSFET 125 is available from SGS-Thomson Microelectronics, and is sold under Model No. P5N80. The gate input of the MOSFET 125 connects to logic circuitry 133 which receives a clock input (CLOCK) from a crystal oscillator (not shown) or the like, and a duty-cycle control input from a pulse width modulation (PWM) comparator 135. In one advantageous embodiment, the logic circuitry 133 comprises an RS flip-flop with the reset (R) input connected to the output of the comparator 135 and the set (S) input connected to the clock. In one preferred embodiment, the logic further includes a toggle flip-flop which is used to mask-out, or blank, half of the clock cycles so that a 50% duty cycle is the maximum output of the logic 133.

The comparator 135 receives a noninverting input via a line 137 which connects to a low pass filter comprising a resistor 136 and a capacitor 138. The resistor 136, in turn, connects between the sensing resistor 130 and the source of the MOSFET 125. In one embodiment, the resistor 136 is approximately 300 ohms. An inverting input 139 of the comparator 135 is provided from an output of a differential amplifier 140. In one preferred embodiment, the logic 133, the comparator 135 and the differential amplifier 140 are sold together in an integrated circuit (IC) package by UNITRODE under Part No. P/N UC3844. The application notes for the UNITRODE P/N UC3844 are available from: UNITRODE INTEGRATED CIRCUITS CORP., at Seven Continental Blvd., Merrimack, N.H., 03054-0399; telephone number 603-424-2410; and are hereby incorporated by reference. The IC package also includes other circuitry such as undervoltage protection circuitry (not shown) as is well known to those of ordinary skill in the art. Other circuitry, such as the temperature and voltage sense circuitry (not shown), are advantageously included in a separate IC package (e.g., sold under Model No. BQ2004) at the secondary side of the transformer. When a sufficient negative voltage change or a sufficient positive temperature change is detected, the voltage or temperature sense circuitry within the IC package causes a trickle current of approximately 3 milliamps (down from approximately 600 milliamps) to flow into the battery 122, as will be appreciated by one of ordinary skill in the art.

The differential amplifier 140 receives a voltage reference input 142 at a noninverting input, and a voltage output feedback at an inverting input 144. The inverting input 144 connects to a resistor network comprising a resistor 145 (approximately 16 Kohms in one embodiment) and a resistor 146 (approximately 1.2 Kohms in one embodiment). A zener diode 147, rated at approximately 16.7 volts in one embodiment, connects between the resistors 145, 146 at the anode, while the cathode of the zener diode 147 connects to a filtering capacitor 148 which is also connected to ground. The cathode of a rectifier diode 149 connects to the filtering capacitor 148 and to the cathode of the zener diode 147, while the anode of the diode 149 connects to a second secondary winding 152. The second secondary winding 152 advantageously comprises a portion of the transformer 110, and has approximately 18 turns (i.e., 1.5 times the number of turns of the first secondary 114).

A voltage divider circuit comprising a resistor 150 and a variable resistor 155 connects between the input terminal 105 and a reference voltage ($V_{REF}$) terminal 160. In addition, the noninverting input 137 of the comparator 135 connects to the conjunction of the two resistors 150, 155. In one advantageous embodiment, the resistor 150 comprises a 220,000 ohm resistor, while the resistor 155 comprises a 2,000 ohm resistor.

Although, in the preferred embodiment, the voltage applied to the inverting input 144 of the amplifier 140 is substantially fixed, the operation of the circuit of FIG. 1 will be described first as though the voltage on the terminal 144 were allowed to vary with the voltage across the battery 122. Furthermore, the operation of the circuit 100 will be described below as if the voltage divider circuit comprising the resistors 150, 155 were not connected within the circuit 100, and, thereafter, the operation of the circuit 100 including the voltage divider portion will be described.

A rectified DC voltage is applied to the voltage input terminal 105. Typically, a rectified DC voltage may include ripple because the voltage waveform is not perfectly smoothed by the filtering capacitor. In a preferred embodiment, it is advantageous for the rectified DC voltage to have a peak-to-peak ripple voltage which is less than 20% of the average voltage value. For example, if the average value of the DC voltage is 120 volts, then the ripple waveform which rides on the DC voltage will vary by approximately 12 volts above and 12 volts below the average DC voltage value. Of course, it will be understood by those of skill in the art that the actual tolerable ripple voltage will vary from application to application, so that the particular implementation should determine what the allowable ripple voltage will be.

The rectified DC voltage applied to the voltage input terminal 105 causes a current to flow through the primary windings 112 of the transformer 110 when the MOSFET 125 allows current to flow from the drain to the source (i.e., acts as a closed switch). The current through the primary windings 112 of the transformer 110 induces a current within the first and second secondary windings 114, 152 of the transformer 110. As discussed above, the ratio of the primary winding 112 to the first secondary winding 114 is ten to one, so that the voltage generated across the first secondary winding 114 is one-tenth the voltage across the primary winding 112. Since the MOSFET 125 switches on and off during the course of the charging of the battery 122, current flow will increase and decrease through the primary winding 112 so that a back EMF may be generated within the first secondary winding 114. Thus, the diode 118 acts to inhibit current flow in the reverse direction (i.e., from the diode 118 to the first secondary winding 114) when this back EMF is generated. Thus, the current flow is always in the same direction into the battery 122 so as to provide continuous charging of the battery 122.

Feedback voltage is taken from the second secondary winding 152 and is fed into the inverting input of the differential amplifier 140. The winding 152 operates to provide a feedback voltage which is proportional to the battery voltage, while providing electrical isolation between the output and the feedback loop. When current flows through the primary winding 112, a secondary current is induced in the second secondary winding 152 in the subsequent cycle. This produces a voltage which is rectified by the diode 149 and is smoothed out by the capacitor 148. The zener diode 147 reduces the voltage across the capacitor 148 by 16.7 volts, and the remaining voltage appears across the resistor 146. The voltage across the resistor 146 is provided as the inverting input 144 of the amplifier 140 via the resistor 145. In this manner, a feedback voltage which is indicative of the voltage at the output terminal 120 of the circuit 100 is applied to the inverting input terminal 144 of the amplifier 140.

The reference voltage is applied to the noninverting input 142 of the differential amplifier 140 so that a voltage difference signal ($V_{ERROR}$) representing the difference between the reference voltage and the voltage on the terminal 144, is output over the line 139.

The difference voltage is fed into the inverting input 139 of the pulse width modulation comparator 135. Furthermore, a current sensing voltage generated across the resistor 130, and filtered by the resistor 136 and the capacitor 138 to remove spikes, is applied to the noninverting input 137 of the comparator 135. Since the voltage across a resistor is always proportional to the current flow, the voltage across the resistor 130 is indicative of the current flow through the resistor 130 and, consequently, is an indication of the drain-to-source current through the MOSFET 125 which flows through the primary winding 112 of the transformer 110. Thus, the voltage applied to the noninverting input 137 of the comparator 135 provides a measure of the current flow through the primary windings 112.

Figure 4A:
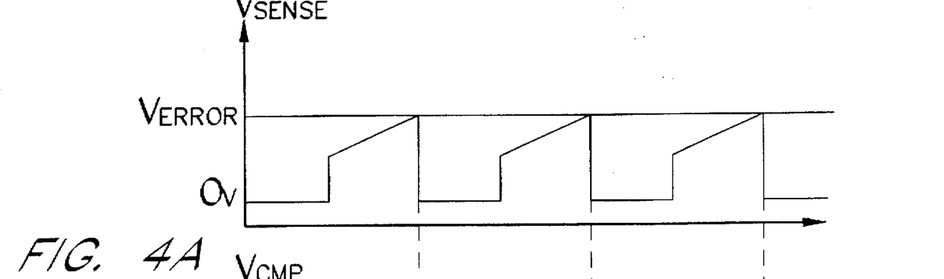
FIG. 4A illustrates an exemplary voltage waveform measured across a current sensing resistor of FIG. 1.

FIG. 4A illustrates an exemplary voltage waveform taken across the sensing resistor 130. Since this current flow is proportional to the output current flow provided to the battery 122 through the terminal 120, the comparator 135 receives voltages across the lines 139, 137 which are indicative of both the voltage across the battery 122 and the current flowing through the battery 122 via the output terminal 120.

Figure 4B:
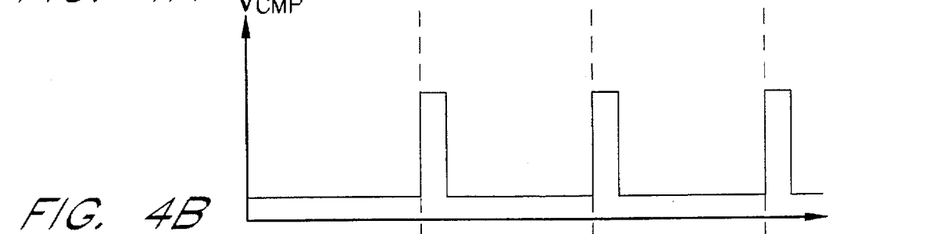
FIG. 4B illustrates an exemplary voltage waveform measured at the output of a comparator in FIG. 1.

Thus, if no connection were made between the input terminal 137 and the voltage divider comprising the resistors 150, 155, the output of the comparator 135 would supply the logic 133 with a signal which is a function of both the output current and output voltage. For example, FIG. 4B illustrates an exemplary voltage waveform ($V_{CMP}$) which is produced at the output of the comparator 135. As can be seen from the diagram of FIG. 4B, the comparator outputs a positive pulse each time the sense voltage (applied at the input 137) ramps up to the voltage level defined by $V_{ERROR}$. Thus, the error voltage determines the threshold at which the current sense voltage input on the line 137 will cause the comparator 135 to generate a reset pulse.

Figure 4C:
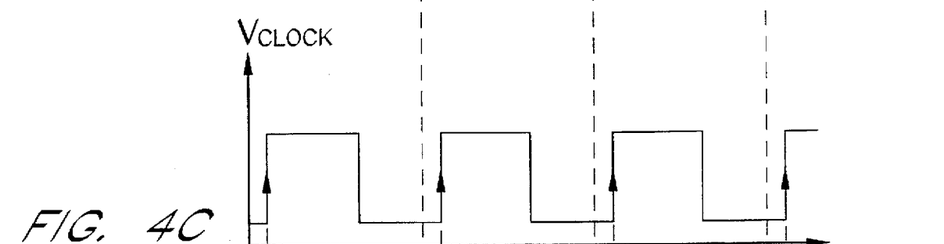
FIG. 4C illustrates an exemplary voltage waveform measured at a clock input of FIG. 1.
Figure 4D:
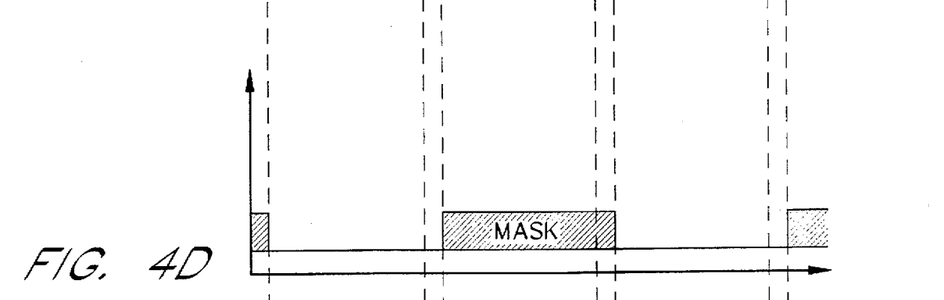
FIG. 4D illustrates the effect of a masking toggle flip-flop which masks the output of the comparator of FIG. 1 in alternate clock cycles.
Figure 4E:
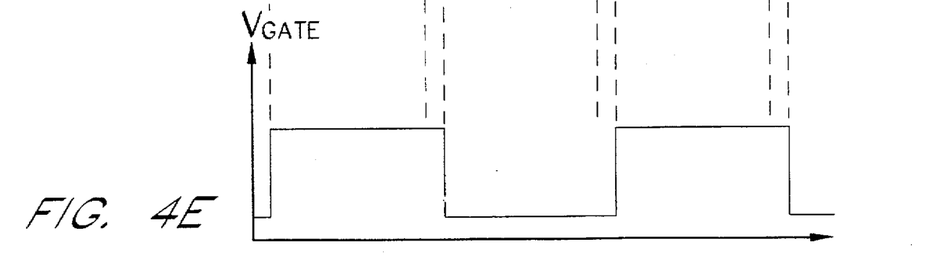
FIG. 4E illustrates an exemplary voltage waveform measured at the gate of a transistor depicted in FIG. 1.
Figure 5A:
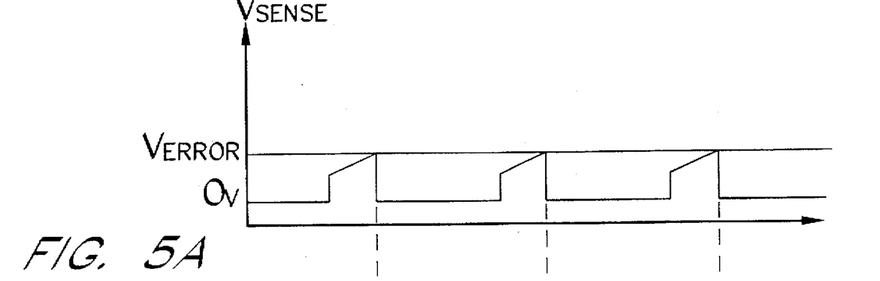
FIGS. 5A–5E illustrate the same waveforms as FIGS. 4A–4E, respectively, for the case where the duty cycle is reduced due to a lower error voltage threshold.
Figure 5B:
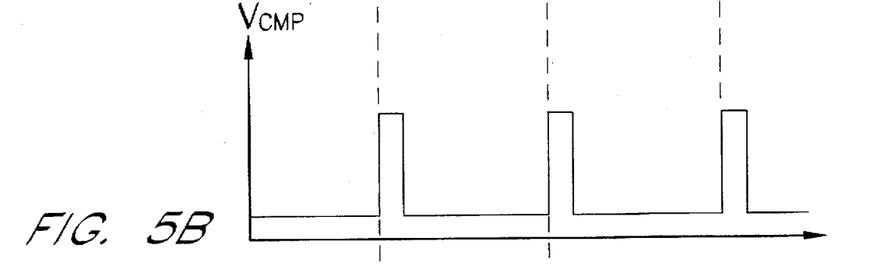
Figure 5C:
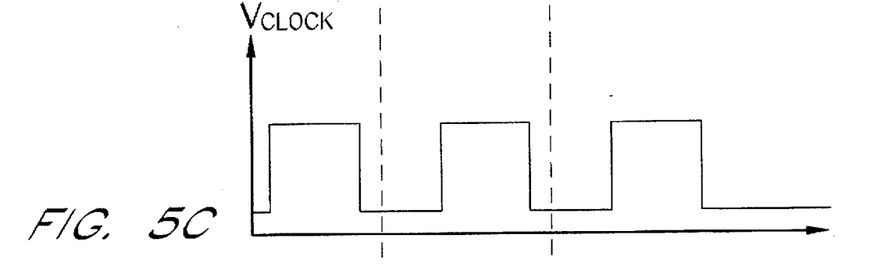
Figure 5D:
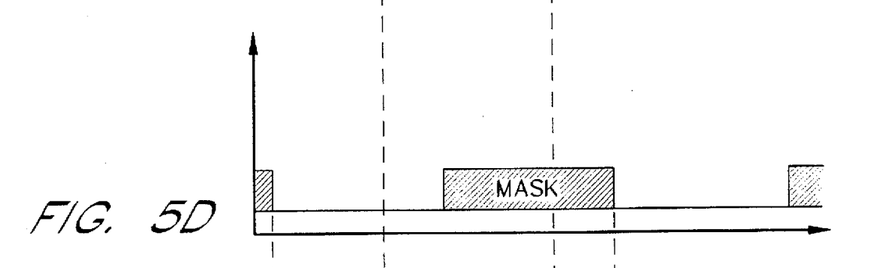
Figure 5E:
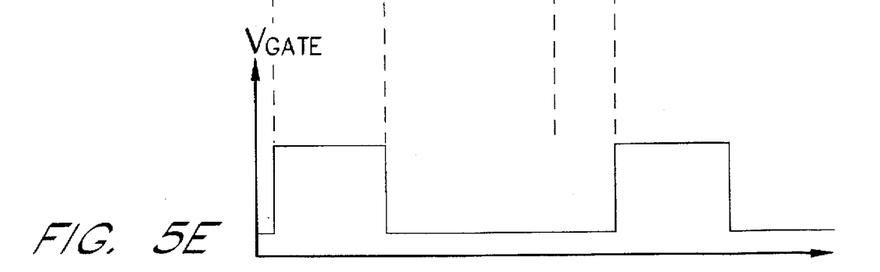

This reset pulse controls the duty cycle of a logic pulse generated by the logic 133, and which is provided to the gate of the MOSFET 125. This is illustrated in FIGS. 4C, 4D and 4E. FIG. 4C illustrates the clock signal applied to the S input of the logic 133, while FIG. 4D illustrates the masking cycles resulting from the internal toggle flip-flop circuitry (not shown) as is well understood in the art. FIG. 4E depicts the final output of the logic 133. The frequency of the pulse applied to the gate of the MOSFET 125 is determined by the frequency of the clock input. The clock frequency is approximately 105 KHz, in one preferred embodiment. A positive value of the clock input causes the output of the flip-flop 133 to set to a high output value, while a positive value of the output of the comparator 135 applied to the R input of the flip-flop 133 causes the output of the flip-flop 133 to reset to a zero, or low voltage level. Thus, the duty cycle of the output signal of the flip-flop applied to the gate of the MOSFET ($V_{GATE}$) can be increased or decreased as the position of the reset pulse relative to the leading edge of the clock input changes.

FIGS. 5A–5E illustrate the case where the error voltage, $V_{ERROR}$, is decreased to a significantly lower level. In conventional constant power charging circuits, the error voltage approaches zero as the battery voltage feedback approaches the reference voltage. As can be seen from the waveforms of FIGS. 5A–5E, the position of the pulse output by the comparator 135 can be made closer to the leading edge of the clock pulse. Since the position of the pulse output by the comparator 135 can be made closer to the leading edge of the clock pulse (thereby reducing the duty cycle of the gate voltage) by lowering $V_{ERROR}$ (or by increasing the slope of the sense voltage, $V_{SENSE}$), it is clear that both the value of the current supplied to the battery 122 and the value of the feedback voltage indicative of the voltage across the battery 122 factor into the feedback loop which controls the current supplied to the battery 122. In this manner, assuming that the error voltage is able to vary, and without the input by the voltage divider resistors 150, 155, the circuit of FIG. 1 would act as a constant power source which maintained a substantially constant product of voltage and current provided as an input to the battery 122.

In accordance with an improvement of the preferred embodiment of the invention, the voltage applied to the inverting input 144 of the amplifier 140 is held to substantially zero volts. Furthermore, for reasons which will become apparent in the following description, the voltage divider comprising the resistors 150, 155 connects between the input terminal 105 and a reference voltage terminal 160. In one preferred embodiment, the reference voltage applied to the terminal 160 is the same as the reference voltage applied to the noninverting input 142 of the differential amplifier 140. However, it should be appreciated that the reference voltage applied to the input terminal 160 may be independent of the reference voltage applied to the noninverting input 142 so that variable control of the voltage applied to the terminal 160 is possible.

By holding the voltage at the inverting terminal 144 of the amplifier 140 to substantially zero volts, the error voltage, $V_{ERROR}$, will be held to a fixed value. This ensures that a constant current will be output since the variation in the duty cycle of the current output is dependent upon the variations in the error voltage threshold as described above.

Because the voltage across the battery must remain below a predefined value (e.g., eight volts), the voltage induced across the winding 152 will remain below a fixed value as long as the battery 122 is connected. Thus, if the zener diode 147 drops a sufficiently high voltage (i.e., more than the voltage developed across the winding 152), then the net voltage at the inverting input 144 will be substantially zero.

Although holding $V_{ERROR}$ constant would theoretically be sufficient to maintain a constant output current, in practice difficulties are encountered in controlling the output current to a degree of accuracy required for certain applications. In particular, because the tolerances for the inductance of the coils in the primary windings 112 is uncertain, the duty cycle (which, as is well known in the art, is a function of the inductance of the primary winding, the input voltage and the current through the primary winding) that defines the average output current is difficult to control to precise tolerances from charging unit to charging unit. Thus, in order to compensate for the varying inductances found in different transformer windings for each charging unit, the voltage divider circuit comprising the resistor 150 and the variable resistor 155 is included in the preferred embodiment.

It will be appreciated that, since the voltage at the input terminal 105 does not vary significantly, and the reference voltage applied to the terminal 160 is also constant, the voltage at the non-inverting terminal 137 is substantially constant. However, due to the connection of the resistor 136 and the voltage developed across the resistor 130, the voltage produced at the noninverting input 137 of the comparator 135 actually varies in response to the current through the sense resistor 130.

Briefly put, the variable resistor 155 changes the slope of the voltage developed across the resistor 130. Since, as shown above, the rate at which the sense voltage ramps up (i.e., the slope of the sense voltage across the resistor 130) determines the duty cycle of the gate voltage, $V_{GATE}$, the duty cycle of the output current can be precisely controlled by varying the precision resistor 155. In this manner the variations in inductance in transformers of different units can be compensated for by setting the resistor 155 to the appropriate value.

Figure 6A:
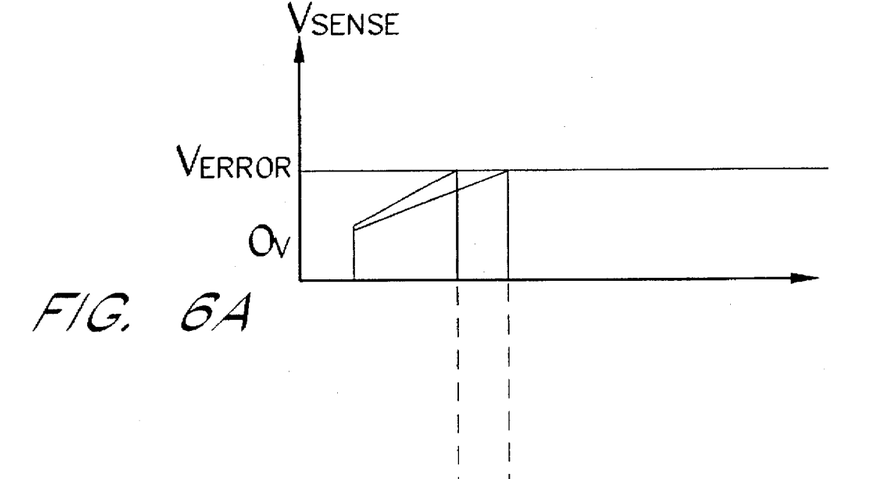
FIGS. 6A–6C illustrate the advantages of the preferred embodiment of the invention wherein the duty cycle of the current output can be altered by altering the slope of the current sense feedback voltage.

FIG. 6A depicts a waveform which illustrates the voltage level applied to the input terminal 137 of the comparator 135 as constructed in accordance with the preferred embodiment. Because the resistance value of the resistor 130 is significantly less than that of the resistor 136, substantially all of the current output by the source of the MOSFET 125 will flow through the resistor 130 to generate essentially the same voltage as would be generated if the voltage divider circuit were not connected to the input terminal 137.

Figure 6B:
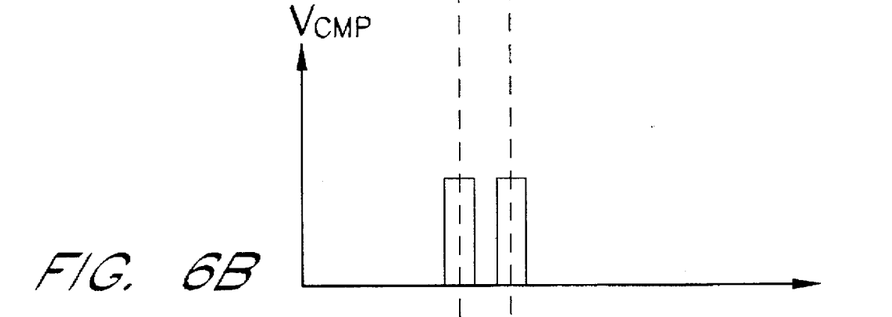
Figure 6C:
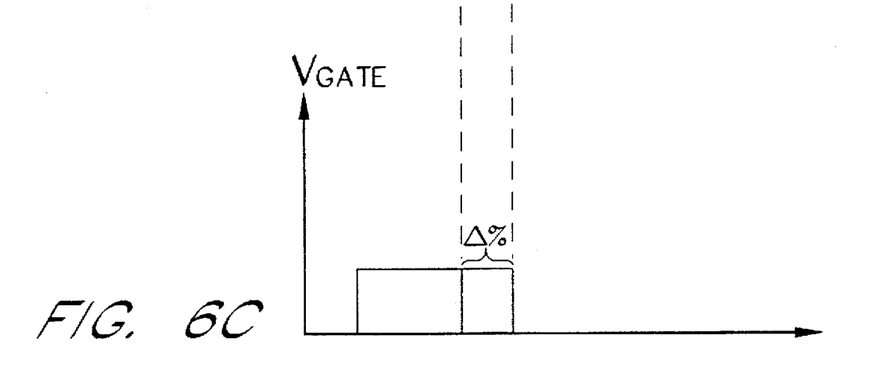

Furthermore, as can be shown using conventional circuit analysis techniques, the resistors 150, 155 and 136, together with the voltage applied to the terminal 160 will act in conjunction to alter the slope of the voltage developed across the resistor 130 so that a voltage having different rise time characteristics from the voltage across the resistor 130 will be observed at the input terminal 137. In one embodiment, where the resistor 155 is adjustable from 1.8 Kohms to 2.3 Kohms while the resistor 136 is approximately 300 ohms, it has been found that the voltage developed at the noninverting input 137 of the comparator 135 can be varied between approximately 88% and 85.5% of the voltage across the resistor 130. That is, the slope of the voltage applied at the terminal 137 can be controlled to between 88% and 85.5% of the slope of the voltage developed across the resistor 130. The case where the slope of the voltage at the terminal 137 varies is depicted clearly in FIG. 6A. As can be seen from FIGS. 6A–6C, a difference in the slope of the voltage results in an earlier or later pulse output by the comparator (FIG. 6B), which, in turn, results in a shorter or longer pulse at the gate of the MOSFET 125. The variation in the duty cycle of the $V_{GATE}$ signal is represented in FIG. 6C as Δ%. Thus, the voltage divider circuit comprising the resistors 150, 155 operates to alter the voltage level of the current sense voltage to thereby control the slope of the voltage applied to the noninverting input 137 in order to compensate for variations in the inductance of the primary winding 112.

The net effect of this altered voltage is to cause the comparator 135 to produce an output signal which is a substantially constant current within a well defined tolerance range. In one preferred embodiment, the duty cycle of the signal applied to the gate of the MOSFET 125 ($V_{GATE}$) is approximately 40% throughout the entire charge cycle. In this case, the circuit 100 acts solely as a constant current source and does not provide constant power.

It should be noted here that the term "substantially constant current" as used herein, is not limited to an actually constant current value where the same current flow is measured at any moment in time. For instance, the current source of the preferred embodiment injects regular pulses of current, having a substantially constant duty cycle, so that the time averaged current input is substantially constant for any given time period. Thus, a substantially constant current could signify an actually constant current or a regular or time averaged current input level which is the result of a pulsed signal having a constant duty cycle.

Charging of the battery is reduced to a trickle current as soon as the voltage sense circuitry (not shown) detects a significant negative slope in the battery voltage (e.g., a decrease of at least 12 millivolts over a 34 second period in one embodiment). This causes the battery to be automatically disconnected from the circuit 100 so that the voltage across the winding 152 is no longer held to a voltage proportional to the battery voltage. Thus, a voltage greater than the voltage dropped across the zener diode 147 is developed across the capacitor 148 so that the voltage applied to the input 144 of the amplifier 140 increases. This causes the error voltage output by the amplifier 140 to reduce to zero so that the comparator 135 outputs a constant reset signal to disable the logic 133. In this manner the average current supplied to the primary winding 112 is reduced substantially at the termination of the charge cycle.

It can be seen from the foregoing description that the circuit of the preferred embodiment depicted in FIG. 1 overcomes the disadvantages of prior charging circuits. First, the circuit may be implemented for a negligible cost over conventional circuits, since the resistors 150, 155 together cost on the order of a few cents. Furthermore, since the current is held substantially constant, and the voltage is allowed to vary, the curve 210 of FIG. 2 exhibits sufficient variation so that a negative voltage change will be detectable within a short time period before the battery 122 is adversely affected. In addition, the temperature profile curve 220 of FIG. 2 exhibits sufficient variation so that a positive change in temperature is detectable over a shorter period of time to terminate the charging phase and provide only a trickle current as input to the battery 122. Furthermore, since the charging current is maintained at a substantially high level, even as the voltage increases, charging of the battery 122 may be accomplished in a much shorter time period (e.g., on the order of 2–4 hours, as compared to the 10–12 hours required for conventional battery chargers). Finally, because a constant current is provided at the front end of the circuit 100 (i.e., as an input to the primary windings 112 of the transformer 110) there is no necessity for a back-end current regulator at the output of the secondary windings 114 of the transformer 110. Thus, inefficiencies associated with a constant current regulator are not observed in the circuit of the preferred embodiment. Furthermore, a smaller transformer, such as the transformer 110, may be used so that there is a negligible loss of efficiency.

Figure 3A:
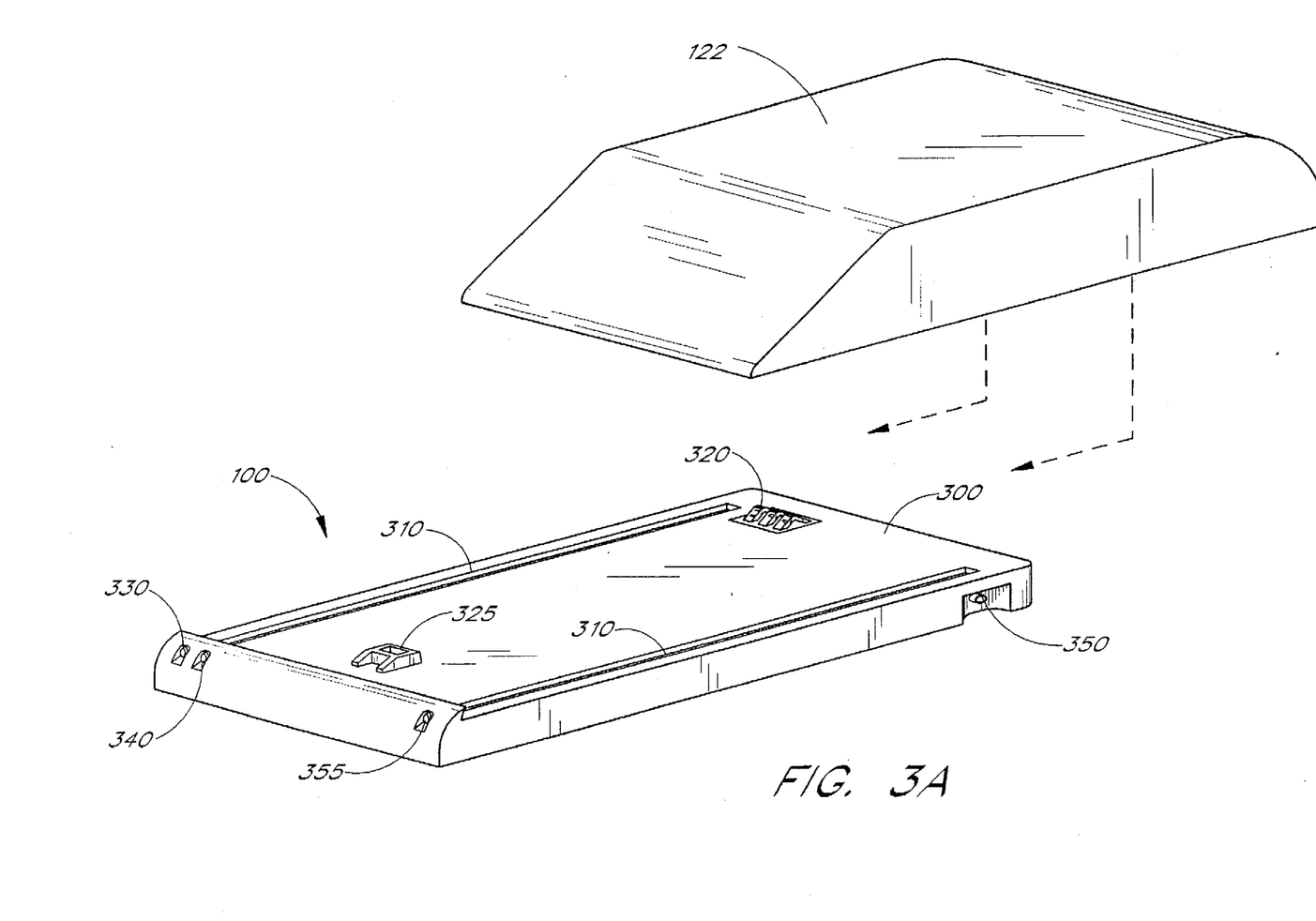
FIG. 3A illustrates a perspective view of the battery charger of the present invention.

FIG. 3A illustrates a perspective view of the battery charger 100 in a preferred embodiment of the present invention. The battery charger includes a housing 300 which engages with the battery 122. As discussed above, the battery 122 advantageously comprises a nickel cadmium or nickel metal-hydride battery, such as used with cellular telephones or video camera recorders. Guiding rails 310 integrally formed with the housing 300 mate with receiving channels (not shown) on the battery 122 to guide the battery 122 into place for connection with the housing 300 of the battery charger 100. A receptacle 325 is formed on the surface of the housing 300 as a means for securing the battery 122 to the housing 300 by snapping the battery 122 into a locked position.

When the battery 122 is locked into position with the housing 300, contacts 320, which are in electrical communication with ground and to the output terminal 120 of FIG. 1, establish an electrical connection between the battery 122 and the battery charger 100. In addition, the third contact 320 depicted in FIG. 3A provides temperature sensing, as is well understood in the art. When power is supplied to the battery charger 100 (i.e., from an AC outlet via a plug (see FIG. 3B) or from a DC supply, such as a cigarette lighter in an automobile, via a line 322), the battery charger 100 supplies recharging energy to the battery 122 via the contacts 320.

Light-emitting diodes (LEDs) 330, 340 indicate the status of the battery charge. Initially, when the battery is first charging, the LED 340 either flashes red, or maintains a constant red. When the charging is accomplished and the battery 122 is fully recharged, the LED 330, which may comprise a green LED, turns on, and the LED 340 turns off.

In addition to the above enumerated features of the battery charger 100, a conditioner circuit activated by a switch 350 is used to condition the battery 122 in the event that the battery 122 exhibits any deleterious memory effects wherein the battery does not recharge to the appropriate voltage level. In one embodiment, while battery conditioning is occurring, a yellow LED 355 flashes on and off, and maintains a solid yellow color when the battery conditioning is complete. This battery conditioning is performed in a conventional manner, as is well known to those of ordinary skill in the art.

In addition to the features described above, the battery charger 100 of the preferred embodiment also includes other additional features for battery protection. For example, the battery charger may include a time-out protection timer which reduces the charge supplied to the battery 122 to a trickle current of about 3 milliamps after three hours. Furthermore, once the battery becomes fully charged, if, for some reason, a substantial current is still flowing to the battery 122, then the overcharge protection circuit will shut down the battery charger 100 within four minutes. In addition, an under-voltage protection sensor detects when the rectified DC voltage varies significantly beneath the allowable voltage level for proper operation of the battery charger. For example, in a system where 120 volts is the optimum operating voltage, the under-voltage protection will detect input voltages beneath 95 volts, and will prevent the battery charger 100 from operating under these circumstances.

Figure 3B:
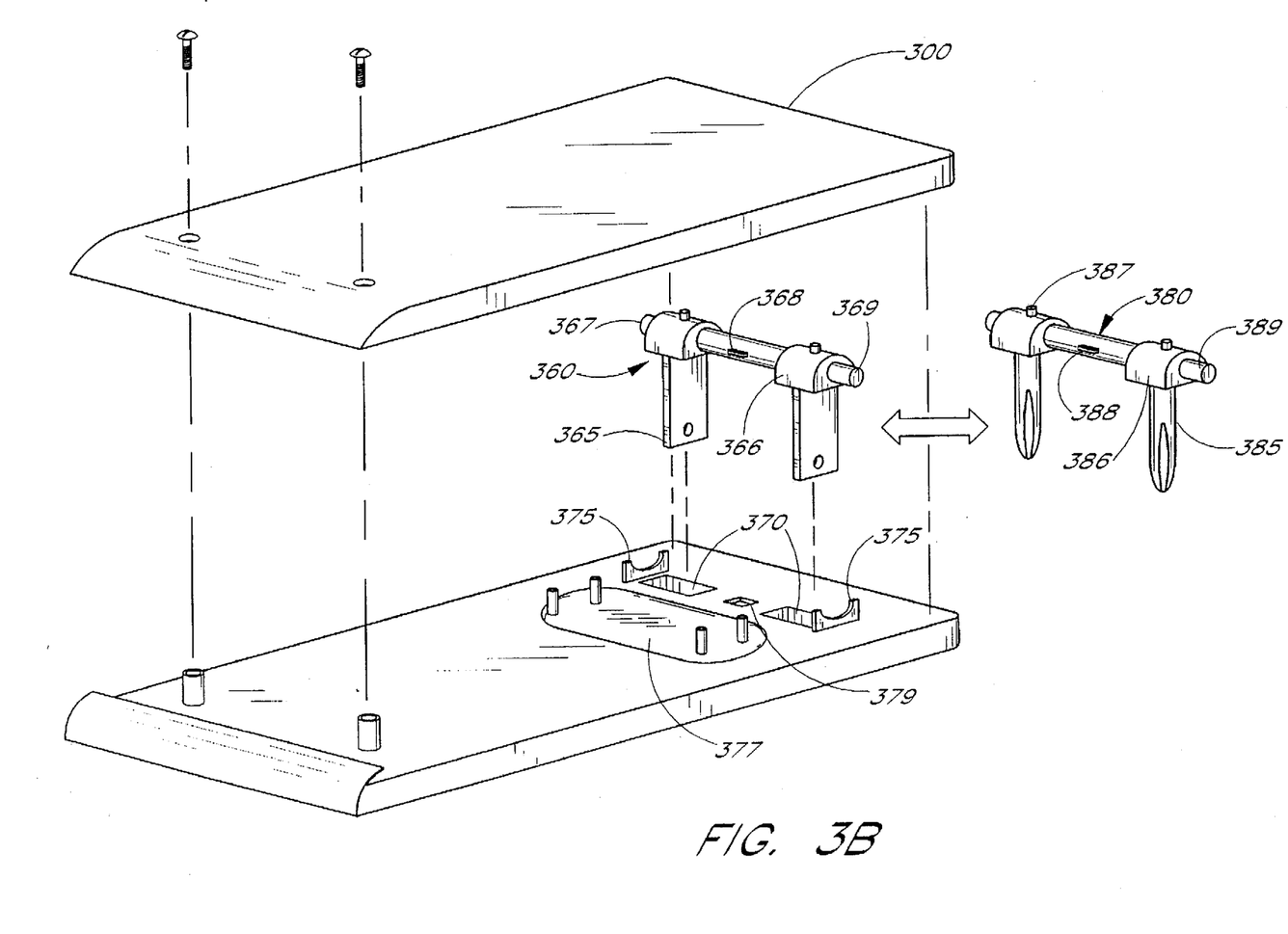
FIG. 3B is an exploded view of the battery charger of the present invention illustrating the replaceable plug aspect of the invention.

FIG. 3B is an exploded perspective view which illustrates a further aspect of the present invention wherein different kinds of plugs are easily interchangeable within the battery charger 100 of the preferred embodiment. As shown in FIG. 3B, the housing 300 disengages into two separate parts. Although not depicted in FIG. 3B, the electrical circuitry is typically contained within the top half of the housing 300, while the bottom half of FIG. 3B is simply a plastic casing to completely enclose the charging circuit 100.

A terminal assembly 360 includes a pair of terminal elements 365 which extend outwardly from an insulating base element 366. The terminal elements 365 are such as those found in a conventional male wall plug for connection with a United States plug outlet (e.g., such as one defined in the United States standard UL 1310 or the Canadian standard CSA 22.2). The electrically conductive terminal elements 365 are rigidly affixed within the insulating base element and are in electrical communication with electrically conductive contacts 367 opposite the terminal elements 365. The electrically conductive contacts 367 establish electrical communication between the terminal elements 365 and spring metal leaf contacts (not shown) connected to the battery charging circuit 100.

The terminal assembly 360 is positioned to detachably engage with the bottom portion of the housing 300 so that the terminal elements 365 extend through apertures 370 formed within the bottom portion of the housing 300. In addition, pivot pins 369 formed on opposite sides of the insulating housing 366 rest within slots 375 so that the terminal assembly 360 pivots within the slots 375. In a particularly advantageous embodiment, backings (not shown) are included in the top portion of the housing 300 to completely enclose the pivot pins 369 within the slots 375. In this manner, the terminal assembly 360 is readily replaceable with a similarly constructed terminal assembly.

When the terminal assembly 360 is properly positioned within the bottom portion of the housing 300, the top portion of the housing 300 is snapped-on to enclose the terminal assembly 360 within the housing 300. The terminal elements 365 of the terminal assembly 360 then extend outwardly from the housing 300 through the apertures 370, and may be pivoted into an inactive position so that the terminal elements 365 lay flush with the external surface of the bottom portion of the housing 300. To provide a receptacle for the terminal elements 365, a raised portion 377 is formed within the bottom portion of the housing 300 so that a corresponding depression for receiving the terminal elements 365 is formed on the external surface of the bottom portion of the housing 300. Thus, when the terminal assembly is positioned such that the terminal elements 365 extend outwardly from the housing 300, the housing 300 can be plugged into a United States standard wall outlet. When in an inactive state, the terminal elements 365 can be pivoted so that they do not protrude from the housing 300.

In a particularly preferred embodiment, detents 368 protrude from a cross-beam portion of the base element 366 used for spacing the terminal elements at the appropriate width. The detents 368 (only one of which is shown in FIG. 3B) are received by a receptacle 379 formed between the apertures 370 in order to hold the terminal assembly 360 in a fixed position when the terminal assembly is either extended orthogonally outward from the housing 300, or are resting within the depression 377. Advantageously, a slight amount of pressure will cause the detents 368 to disengage from the receptacle 379 so that it is convenient to snap the terminal assembly 360 into the closed position or into the open position.

Also shown in FIG. 3B, in accordance with one aspect of the preferred embodiment of the invention, is an international terminal assembly 380 (e.g., as defined by the European standard EN 60950). The international terminal assembly includes generally cylindrical international terminal elements 385 configured to be received within an international wall socket. The international terminal assembly 380 further includes a base element 386, corresponding to the base element 366; contacts 387, corresponding to the contacts 367; and detents 388, corresponding to the detents 368.

Thus, the international terminal assembly 380 is interchangeable with the terminal assembly 360 so that the battery charger 100 may be implemented for use with either a United States wall socket or an international wall socket, with minimum replacement of parts.

It will also be appreciated from the foregoing description that the circuit 100 is particularly advantageous for use with the interchangeable terminal assemblies 360, 380 of FIG. 3B. This is because the circuit 100 is configured to tolerate variations in the input voltage without a significant reduction in performance. Thus, the circuit 100 is able to function with a 110 volt AC input as well as the international voltage input without modification. Consequently, the only modification which needs to be performed to the charger when manufacturing a charger for the United States or for an international market is the exchange of the terminal assemblies 360, 380.

Appendix A is a schematic diagram illustrating one particularly preferred implementation of the present invention.

Although the present invention has been described in detail above, it should be understood that the foregoing description is illustrative and not restrictive. Those of ordinary skill in the art will appreciate that many obvious modifications could be made to the invention without departing from its spirit or essential characteristics. For example, the constant current source of the present invention need not be restricted to nickel cadmium or nickel metal-hydride batteries. Furthermore, the specific elements disclosed within the circuit, such as the comparator, the differential amplifier, the MOSFET, etc., could be replaced with equivalent circuits, as understood by those of ordinary skill in the art. Accordingly, the scope of the present invention should be interpreted in view of the following appended claims.

Appendix A

What is claimed is:

1. A constant current supply circuit for converting a voltage input into a substantially constant supply current, said circuit comprising:
    a voltage input terminal which receives said voltage input;
    an output terminal which provides said supply current output;
    a current generation circuit which receives said voltage input via said voltage input terminal and outputs said supply current to said output terminal; and
    a feedback control circuit in communication with said current generation circuit so as to provide a feedback input signal to said current generation circuit in order to maintain a substantially constant value of said supply current output, said feedback control circuit further comprising:
        a current sensing circuit which provides a current sense signal indicative of said current output by said current generation circuit;
        a voltage level alteration circuit which produces an altered voltage signal which increases as the value of said current sense signal increases; and
        a comparator circuit which compares a voltage level on a first input with said altered voltage signal on a second input to provide said feedback input signal to said current generation circuit and wherein said voltage level on said first input is maintained at a substantially constant value so as to effect the substantially constant value of said supply current output via said feedback input signal.

2. A circuit as defined in claim 1, wherein said constant current supply circuit is implemented as a battery charger.

3. A circuit as defined in claim 2, wherein said constant current supply circuit is implemented as a NiCd battery charger.

4. A circuit as defined in claim 2, wherein said constant current supply circuit is implemented as a battery charger for a rechargeable cellular telephone battery.

5. A circuit as defined in claim 1, wherein said comparator circuit comprises a pulse width modulation comparator followed by a clocked RS flip-flop.

6. A circuit as defined in claim 1, wherein said voltage level alteration circuit comprises a voltage divider circuit.

7. A circuit as defined in claim 1, wherein said first input of said comparator connects to an output of a voltage error detector comprising a differential amplifier and wherein the output of said voltage error detector is held to a substantially constant level.

8. A circuit as defined in claim 1, wherein said current generation circuit comprises a switching MOSFET circuit, a transformer and a rectifier.

9. A circuit as defined in claim 1, wherein said current sense circuit comprises a resistor in series with a current source proportional to said current output.

10. A constant current supply circuit for converting a voltage input into a substantially constant supply current, said constant current supply circuit comprising:
    a transformer having primary and secondary windings, wherein said primary windings connect with an input side of said constant current supply circuit and wherein said secondary windings connect with an output side of said constant current supply circuit;
    an input terminal which connects to said input side of said constant current supply circuit;
    a constant current source on said input side of said constant current supply circuit which receives an input from said input terminal, and which connects to said primary windings to provide a substantially constant current input to said primary windings, said constant current source further comprising:
        a current sensing feedback circuit which outputs a voltage proportional to said substantially constant supply current;
        a voltage level calibration circuit which receives said voltage generated by said current sensing feedback circuit to produce a calibrated voltage output; and
        a current control circuit having an input which receives said calibrated voltage output and applies said calibrated voltage to said input of said current control circuit;
    and
    an output terminal which connects to said secondary windings and outputs a substantially constant output current.

11. A circuit as defined in claim 10, wherein said circuit supplies current for recharging a battery.

12. A battery charging circuit comprising:
    a housing which encloses electrical circuitry for converting an alternating current (AC) power input into an energy output for charging a battery;
    a pair of contacts on an external surface of said housing for outputting said energy to said battery; and
    a readily replaceable terminal assembly which is detachably engaged with said electrical circuitry within said housing, said terminal assembly having terminal elements which extend outwardly through apertures in said housing, said terminal elements configured to engage with an outlet to establish an electrically conductive contact between said outlet and said electrical circuitry within said housing so as to provide said AC power input to said battery charging circuit when said terminal assembly is in an active position, and wherein said terminal assembly is pivotable within said housing so that said terminal elements can be flipped into an inactive position substantially flush with said external surface of said housing.

13. A battery charging circuit as defined in claim 12, wherein said terminal elements are configured to engage with a standard United States wall outlet.

14. A battery charging circuit as defined in claim 12, wherein said terminal elements are configured to engage with a standard International wall outlet.

15. A constant current supply circuit for converting a voltage input into a substantially constant supply current, said circuit comprising:
    a voltage input terminal which receives said voltage input;
    an output terminal which provides said supply current output;
    current generation means for receiving said voltage input via said first input terminal and outputs said supply current to said output terminal; and
    feedback control means in communication with said current generation means so as to provide a feedback input signal to said current generation means in order to maintain a substantially constant value of said supply current output, said feedback control means further comprising:
        voltage error detector means which has a first input in communication with said output terminal and a second input in communication with a reference voltage, said detector means for outputting an error signal indicative of a difference between said reference voltage and a voltage on said output;

current sensing means for providing a signal indicative of said current output by said current generation means;

comparator means having a first input and a second input, wherein said error signal output from said voltage error detector means is applied to said first input and said signal indicative of said current output provided by said current sensing means is applied to said second input; and current regulation injection means in communication with said voltage input terminal and which injects a signal proportional to said input voltage into said second input of said comparator means so as to cause said comparator means to generate said feedback input signal to said current generation means.

* * * * *